Figure 5:
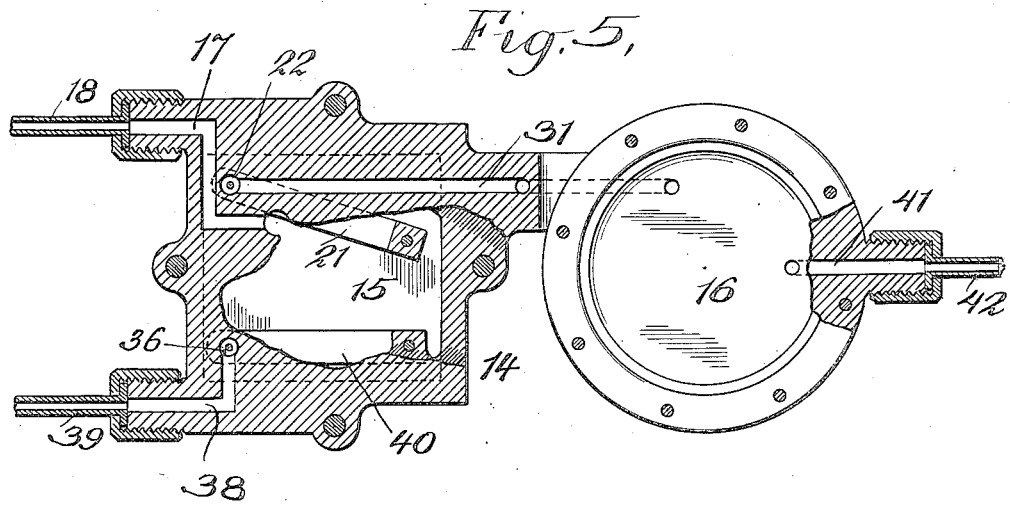

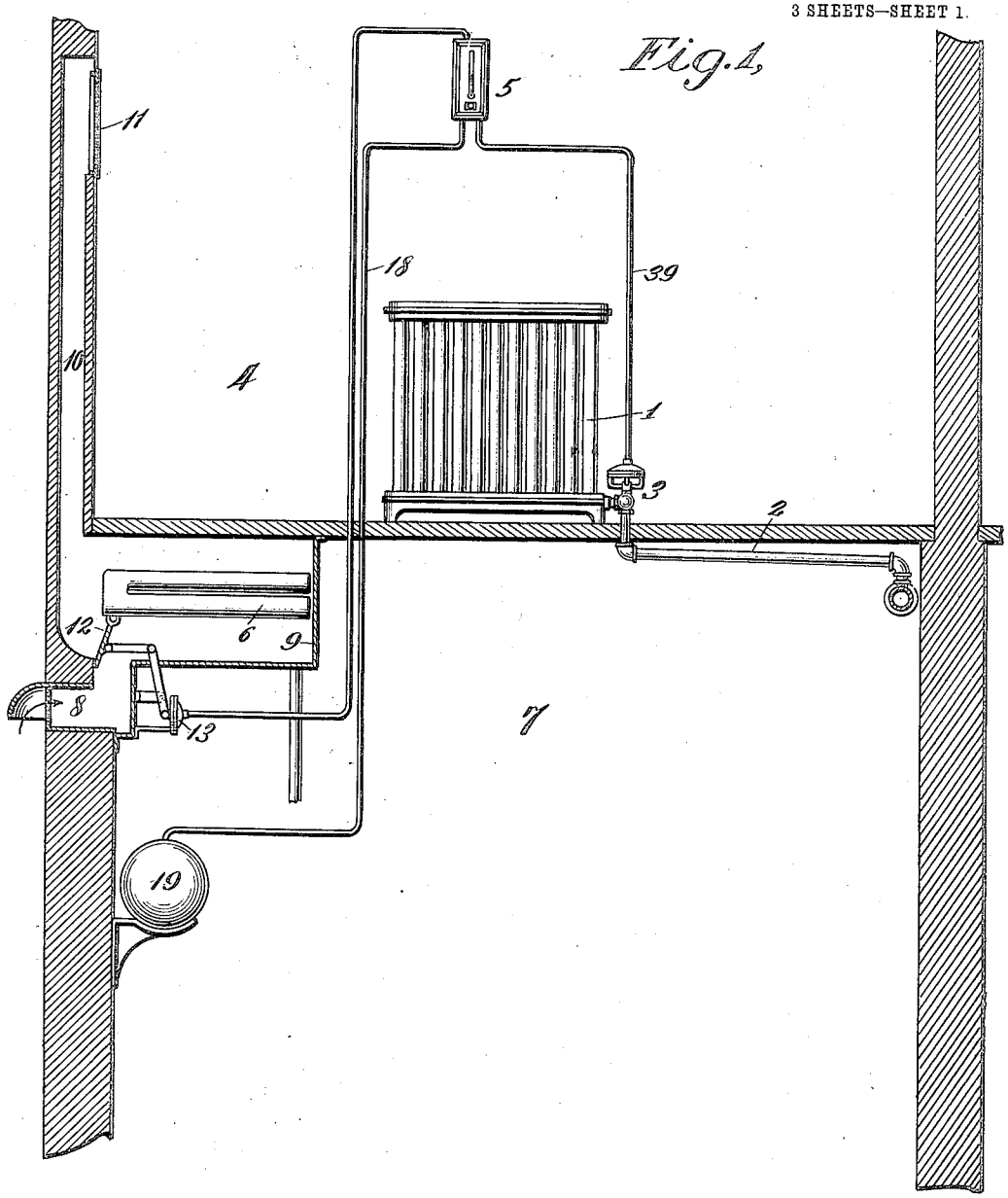

No. 822,554. PATENTED JUNE 5, 1906.
A. ROESCH.
REGULATOR.
APPLICATION FILED APR. 28, 1902.
3 SHEETS—SHEET 2.
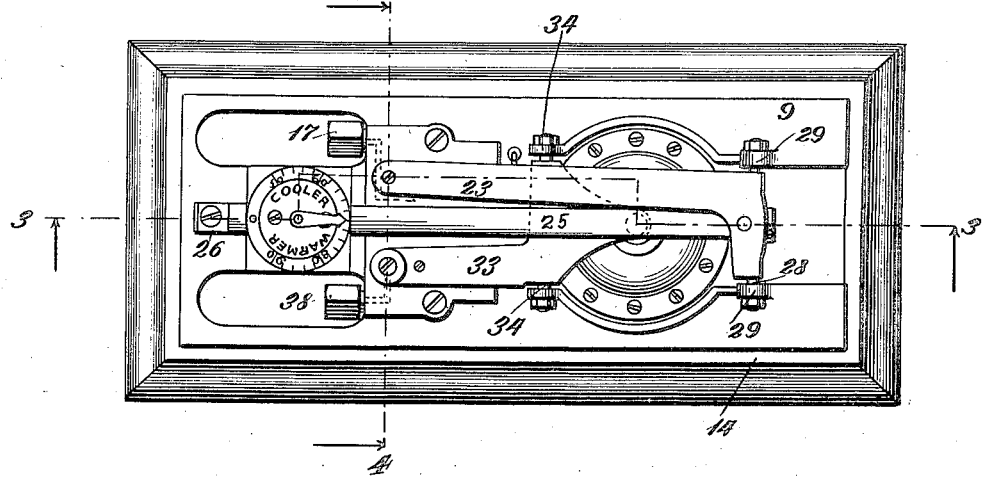
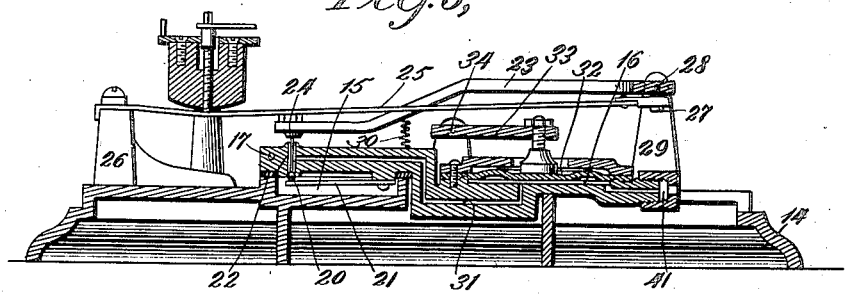
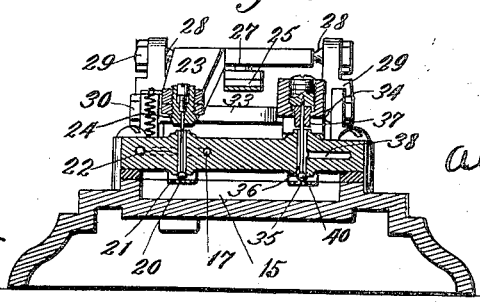
WITNESSES:
J. C. Chapin.
C. F. Carrington
INVENTOR
Alfred Roesch
BY
James ...
ATTORNEY.

No. 822,554. PATENTED JUNE 5, 1906.
A. ROESCH.
REGULATOR.
APPLICATION FILED APR. 28, 1902.

3 SHEETS—SHEET 3.

WITNESSES: Alfred Geo Brown. J. C. Chafin

Alfred Roesch INVENTOR

BY James B Will ATTORNEY

UNITED STATES PATENT OFFICE.

ALFRED ROESCH, OF BRIDGEPORT, CONNECTICUT, ASSIGNOR TO DAVIS & ROESCH TEMPERATURE CONTROLLING COMPANY, OF NEW YORK, N. Y., A CORPORATION OF NEW JERSEY.

REGULATOR.

No. 822,554.                Specification of Letters Patent.            Patented June 5, 1906.

Application filed April 28, 1902. Serial No. 104,910.

*To all whom it may concern:*

Be it known that I, ALFRED ROESCH, a citizen of the United States of America, and a resident of Bridgeport, in the county of Fairfield and State of Connecticut, have invented certain new and useful Improvements in Regulators, of which the following is a specification, reference being had to the accompanying drawings, forming a part thereof.

My invention relates to that class of apparatus employed to automatically regulate the temperature of apartments, dwellings, schoolrooms, theaters, and the like.

My invention consists in a new and improved regulator having a pneumatic or similar valve under the control of a single thermostatic device for operating both the direct and indirect heat controllers of a combined direct and indirect heating system.

The objects of my invention are to operate both the heat-controllers of a combined direct and indirect heating system by the same regulator; to quickly and positively operate the direct-heat controller first and later to operate the indirect-heat controller; to so operate the direct-heat controller that it will always be positively and entirely opened and closed—that is to say, to prevent it assuming an intermediate position for any appreciable time; to so operate the indirect-heat controller as to permit it to assume intermediate positions, and generally to improve and simplify thermostatic regulators.

My invention further consists in certain details of construction of the regulator and in the combination of parts, as will hereinafter be more fully set forth.

I will now proceed to describe an apparatus embodying my invention and will then point out the novel features in claims.

In the drawings, Figure 1 is a somewhat diagrammatic view of a heating system embodying my invention. Fig. 2 is a face view of my improved regulator therein employed. Fig. 3 is a sectional elevation of the same, the plane of section being taken on line 3 3 of Fig. 2. Fig. 4 is a transverse sectional elevation of the same, the plane of section being taken on the line 4 4 of Fig. 2. Fig. 5 is a detail sectional view of certain portions of the base, showing the primary and secondary chambers and certain ducts and passages in connection therewith.

Referring first and more particularly to Fig. 1 of the drawings, it will be found that a heating system combining both a direct-heating means and an indirect-heating means is employed. The heating system as such is not claimed herein, but forms the subject-matter of a copending application filed February 3, 1902, and numbered serially 88,033. I will, however, describe the system in detail as being one in connection with which my improved regulator is adapted to be employed.

A radiator 1, which may be heated by steam introduced through a steam-pipe 2, is provided, the steam-radiator having a controller 3. The controller may be of ordinary and well-known form and may comprise a steam-valve closed by fluid-pressure in a fluid-pressure motor therein provided and opened by spring-pressure when the fluid-pressure is released, all in a manner too well known to require further or more detailed description or illustration herein. The radiator is arranged in an apartment (designated as a whole by the reference-numeral 4,) and a regulator 5, including a thermostatic device, is arranged in the said apartment for controlling the radiator through the operation of the heat-controller 3 thereof. An indirect heater is also provided, which may comprise another radiator 6, arranged in some other part of the building—as, for instance, in the basement—herein designated as a whole by the reference character 7. The radiator 6 is arranged within a heating-chamber 9, and atmospheric air is introduced into the chamber 7 through a grating 8, communicating with the outer atmosphere. The chamber 9 is further in communication with the apartment 4 through a flue 10 and a register 11.

A damper 12 is provided within the chamber 9, and when the damper is in the position in which it is shown in the drawings cold air introduced into the chamber 9 through the grating 8 will pass through the radiator 6 before entering the apartment 4 and will be heated thereby. If the damper 12 be moved to its opposite position, cold air entering the chamber 9 through a grating 8 will pass directly up through the flue 10 and register 11 into the apartment 4 without passing through and being appreciably affected by the radiator 6. A pressure-motor 13 is provided for operating the damper 12 in a well-known manner, and the pressure-motor 13 and damper 12 hence constitute an indirect-heat controller.

Throughout this specification and the claims I have termed the device controlling the indirect-heating system the "indirect-heat controller" and the device 3, controlling the radiator or direct-heating means, the "direct-heat controller." My invention consists in the improved regulator adapted for controlling both said heat-controllers, whereby both the controllers may be controlled in the most approved manner by the same regulator.

Figs. 2, 3, and 4 illustrate my improved regulator, and which is diagrammatically illustrated and referred to as a whole in Fig. 1 by the reference character 5. The regulator comprises a base 14, having arranged therein a primary air-chamber 15 and a secondary air-chamber 16. The primary air-chamber 15 is arranged to be in open communication with a source of fluid-pressure supply. A passage 17 is shown therein for this purpose, said passage connecting, through a pipe 18, (see Fig. 1,) with a compressed-air or other motive-fluid tank 19. A primary inlet-valve 20 is provided within the primary air-chamber 15, said valve being spring-closed by means of a spring 21. The valve 20 is provided with a stem which passes clear through a duct 22, formed in the wall of the primary air-chamber 15, and is engaged at its opposite end by a lever 23. The lever 23 also carries an exhaust-valve 24, which valve is adapted to close the outer end of the duct 22 when the valve 20 is open. The lever 23 is controlled in its movements by a thermostatic strip 25, secured at one end to a post 26 upon the base 14 and at the other end linked to a stud 27, projecting from the lever 23.

The lever 23, and which for the purposes of this specification I hereinafter refer to as the "primary" lever, is pivoted at 28 to lugs 29 upon the base 14. A spring 30, secured to the base and to the said lever, acts in opposition to the tension upon the thermostatic strip 25.

I make no claim to the specific form of thermostat herein illustrated, as the same forms a part of a copending application filed January 14, 1901, Serial No. 43,188. For this specification, however, it will be clear that a contraction of the thermostatic strip 25 will rock primary lever 23 upon its supports and will permit the closing of the inlet-valve 20 under the influence of spring 21 and the opening of the exhaust-valve 24, while an expansion of the thermostatic strip 25 will permit the spring 30 to depress the primary lever 23 and close the valve 24 while opening the inlet-valve 20.

The primary and secondary air-chambers 15 and 16 are connected together by a duct 31 in open communication with the chamber 16 and in communication with the chamber 15 through the primary valve 20. The chamber 16 is an expansible chamber having a diaphragm 32, constituting a movable wall, which diaphragm when moved outwardly is adapted to rock a lever 33, pivoted at 34 upon standards rising from the base 14. The opposite end of the lever 33, hereinafter referred to as the "secondary" lever, engages one end of the stem of a secondary valve 35. This valve 35, like the valve 20, is arranged within the primary chamber 15 and controls the admission of motive fluid to a duct 36 in the upper wall of the chamber 15, through which the stem of valve 35 protrudes. The secondary lever 33 carries an exhaust-valve 37, which controls the exhaust from the opposite end of duct 36. A branch duct 38, connecting with the said duct 36, passes from the regulator, through a pipe 39, to the direct-heat controller 3. A leaf-spring 40 tends normally to close the secondary valve 35 in the same way as the valve 20 is normally closed by its spring 21. The foregoing secondary valve mechanism, and which constitutes a relay mechanism interposed between the primary valve mechanism and the direct-heat controller, is for the purpose of insuring quick and positive action of the said direct-heat controller.

The direct-heat controller comprises a steam-valve or analogous device, and it is important that such valve shall be entirely closed or entirely opened whenever it is operated and shall never remain in any intermediate or partially-closed position. Further, it is advantageous to close it as quickly as possible. The relay mechanism is provided for this purpose; but I make no claim to such relay mechanism per se herein, as such mechanism is claimed in and forms a part of a copending application filed March 14, 1900, Serial No. 8,590. For purposes of this specification, however, it is stated that by the employment of the relay mechanism a small quantity of compressed air or other fluid under pressure passing up through the valve 20 will be sufficient to raise diaphragm 32 to operate the secondary valve 35, so that a sufficient quantity of motive power may be quickly admitted to the direct-heat controller 3 for the purpose of operating it. The primary valve 20 is sometimes opened but an infinitesimal portion, and if such relay mechanism were not provided it would take on such occasions considerable time for the direct-heat controller to be closed or the direct-heat controller might be moved to an intermediate position and remain there temporarily, all of which would be very undesirable. Further, it takes considerable power and pressure to operate the motor necessary for closing the direct-heat-controlling valve, while it takes but a very small pressure to raise the light diaphragm 32 to operate the secondary valve 35.

In order to operate the indirect-heat controller from the same regulator, I have provided a connection 41, which is in open communication with the secondary chamber 16 or with the duct 31, leading to the primary valve 20. When therefore motive fluid is admitted to the chamber 16, motive fluid will also be admitted to the connection 41, which communicates, through a pipe 42, with the motor 13 of the indirect-heat controller. The opening of the primary valve will then not only control the movement of the secondary valve, but will also admit fluid for the purpose of operating the indirect-heat controller. Now it is quite desirable that the indirect-heat controller should be moved very slowly or should be permitted intermediate positions, and the admission of a very small quantity of air through the primary valve 20 for this purpose is hence an advantage in operating this controller instead of a disadvantage, as hereinbefore described, when applied to the operation of the controller 3. Further, it is desirable in a combined system of this character to close off the direct heat before closing the indirect, and this effect will be evidently attained herein by reason of the fact that it requires a very great deal more pressure to operate the motor 13 than to raise the diaphragm 32. Hence the motor of the controller 3 will always tend to close its valve before any movement will take place in the motor 13. Thus the heat-supply may be entirely closed through the direct-heating means 1, while the heat may continue to be admitted through the indirect radiator 6 either entirely or in part, for the conditions may be such that damper 12 may be entirely open to the heating or in any intermediate position, and, finally, of course it may be closed when a sufficient quantity of fluid has been supplied to the motor 13 for such purposes.

It will thus be seen that the pipe 18, primary air-chamber 15, duct 31, secondary air-chamber 16, connection 41, and pipe 42 constitute a main conduit leading from a source of fluid under pressure to a fluid-pressure motor and that said conduit is governed by the primary valve 20. It will also be seen that the branch duct 38 and pipe 39 constitute a branch conduit leading therefrom to a second pressure-motor, the said branch conduit governed by the secondary valve 35, arranged to be opened by fluid which has passed the primary valve.

I do not desire, of course, to be limited to the precise details of construction herein set forth, as the same may obviously be varied within wide limits without departing from the spirit and scope of my invention.

What I claim is—

1. In a temperature-regulator, the combination of a base having therein a primary chamber and a secondary chamber, said secondary chamber having an unobstructed outlet-passage for connection to the actuating means of a heat-controller, and said primary chamber having an unobstructed inlet-passage for connection with a source of fluid-pressure supply, and having also two outlet-passages one of which leads to the secondary chamber and the other adapted for connection to the actuating means of a heat-controller, a valve for controlling the passage from the primary to the secondary chamber, a thermostatic device for operating said valve, a valve for controlling the other outlet-passage from the primary chamber, a diaphragm in communication with the secondary chamber, and means for transmitting movement from the diaphragm to the last-named valve.

2. In a temperature-regulator, the combination of a base having therein a primary chamber and a secondary chamber, said secondary chamber having an unobstructed outlet-passage for connection to the actuating means of a heat-controller, and said primary chamber having an unobstructed inlet-passage for connection with a source of fluid-pressure supply, and having also two outlet-passages one of which leads to the secondary chamber and the other adapted for connection to the actuating means of a heat-controller and each of said two outlet-passages having an exhaust-duct leading therefrom, a primary lever supported upon said base, a thermostatic device for controlling the movements of said lever, valves operated by said lever for controlling the passage leading from the primary to the secondary chamber and the exhaust-duct therefrom, a secondary lever supported upon the base, a diaphragm in communication with said secondary chamber, for controlling the movements of the secondary lever, and valves operated by said secondary lever for controlling the other outlet-passage from the primary chamber and the exhaust-duct therefrom.

3. In a temperature-regulator, the combination with a base having a primary and a secondary chamber therein, the former having means for connecting in with a source of fluid-pressure supply, and the latter provided with a diaphragm, said base having two ducts both leading from said primary chamber to exhaust, one of said ducts having a branch to which a pressure-operated device may be connected, the other of said ducts having a branch leading to the secondary chamber, and having also means to which a second pressure-operated device may be connected, of a primary lever supported upon said base, a thermostatic device for controlling the movements of the said lever, a secondary lever supported upon said base and controlled in its movements by the said diaphragm, and inlet and exhaust valves arranged at opposite ends of both of the ducts, the valves of that duct having the branch to the second chamber, controlled by the primary lever, and the valves for the other duct, controlled by the secondary lever.

4. In a temperature-regulator the combination of a main conduit leading from a source of fluid under pressure to a fluid-pressure motor, a primary valve governing said conduit, a branch conduit leading from said main conduit to a second pressure-motor, a secondary valve governing said branch conduit, and thermostatically-operated means for operating said primary valve and holding same in its operated position without regard to the pressure of the fluid governed by said valve, said secondary valve being arranged to be opened by said fluid after it has passed said primary valve.

ALFRED ROESCH.

Witnesses:
GEORGE E. HILL,
EDWIN N. HALL.